United States Patent
Dixit et al.

(10) Patent No.: US 10,032,014 B2
(45) Date of Patent: Jul. 24, 2018

(54) SYSTEMS AND METHODS FOR TIME CHANGING DYNAMIC SECURITY CODE

(71) Applicant: Empire Technology Development LLC, Wilmington, DE (US)

(72) Inventors: Mandar Shirish Dixit, Nanded (IN); Mona Sharma, Jabalpur (IN); Himanshu Mishra, Agra (IN)

(73) Assignee: Empire Technology Development LLC, Wilmington, DE (US)

( * ) Notice: Subject to any disclaimer, the term of this patent is extended or adjusted under 35 U.S.C. 154(b) by 206 days.

(21) Appl. No.: 14/716,443

(22) Filed: May 19, 2015

(65) Prior Publication Data
US 2015/0332135 A1 Nov. 19, 2015

(30) Foreign Application Priority Data
May 19, 2014 (IN) .......................... 2489/CHE/2014

(51) Int. Cl.
*G06K 19/06* (2006.01)
*G06F 21/36* (2013.01)
(Continued)

(52) U.S. Cl.
CPC .............. *G06F 21/36* (2013.01); *G06F 21/46* (2013.01); *G06K 7/10* (2013.01); *G06K 7/10821* (2013.01);
(Continued)

(58) Field of Classification Search
CPC ....... G06K 19/06037; G06K 19/06046; G06K 19/06103; G06K 19/0614; G06K 7/10; G06F 21/46
See application file for complete search history.

(56) References Cited

U.S. PATENT DOCUMENTS 4,507,349 A * 3/1985 Fromson ................... B32B 7/02
  283/100
4,643,122 A * 2/1987 Seybold ................. G01N 31/22
  116/206

(Continued)

FOREIGN PATENT DOCUMENTS

JP 2011-048710 A 3/2011

OTHER PUBLICATIONS

"Anti-Counterfeiting Packaging Technologies in the Global Pharmaceutical and Food Industries," http://web.archive.org/web/20130831101044/http://www.bccresearch.com/market-research/food-and-beverage/anti-counterfeiting-packaging-food-fod042b.html, Feb. 2011, p. 1.

(Continued)

*Primary Examiner* — Thien M Le
*Assistant Examiner* — April Taylor

(57) ABSTRACT

The present technology provides dynamic security code systems and method for their creation and use. The systems include a base layer including a first pattern and a sublimating compound layer including a plurality of materials selectively covering the base layer. In some embodiments, each of the plurality of materials is configured to sublimate at respective sublimation rates. The system further includes a shielding layer configured to shield the base layer and the sublimating compound layer to form a security code. The shielding layer can be configured to control a diffusion rate of the plurality of materials through the shielding layer such that the security code is changed.

28 Claims, 9 Drawing Sheets

(51) Int. Cl.
*G06K 7/10* (2006.01)
*G06F 21/46* (2013.01)

(52) U.S. Cl.
CPC ... *G06K 19/0614* (2013.01); *G06K 19/06037* (2013.01); *G06K 19/06046* (2013.01)

(56) References Cited

U.S. PATENT DOCUMENTS

| | | | | |
|---|---|---|---|---|
| 5,633,835 A | * | 5/1997 | Haas | G04F 1/00 116/200 |
| 6,452,873 B1 | * | 9/2002 | Holt | G04F 1/00 116/200 |
| 6,519,607 B1 | * | 2/2003 | Mahoney | G06F 3/017 707/769 |
| 8,500,029 B2 | * | 8/2013 | Wien | G06K 19/06046 235/383 |
| 9,251,634 B1 | * | 2/2016 | Fraser | G06T 1/0021 |
| 9,645,552 B2 | * | 5/2017 | Cincotta | G04F 1/02 |
| 2010/0263244 A1 | * | 10/2010 | Tabirian | G09F 3/0291 40/299.01 |

OTHER PUBLICATIONS

Chikos, J.S. and Acree Jr. W.E. "Enthalpies of Sublimation of Organic and Organometallic Compounds," 1910-2001, Journal of Physical and Chemical Reference Data, vol. 31, No. 2, pp. 537-698 (2002).

Kareem, S.A., "Kinetics of Camphor Decomposition in ambient condition," Research Communications in Chemistry, pp. 8-11 (2000).

Watters, C., "Cyclododecane: A closer look at practical issues," pp. 195-204 (2007).

* cited by examiner

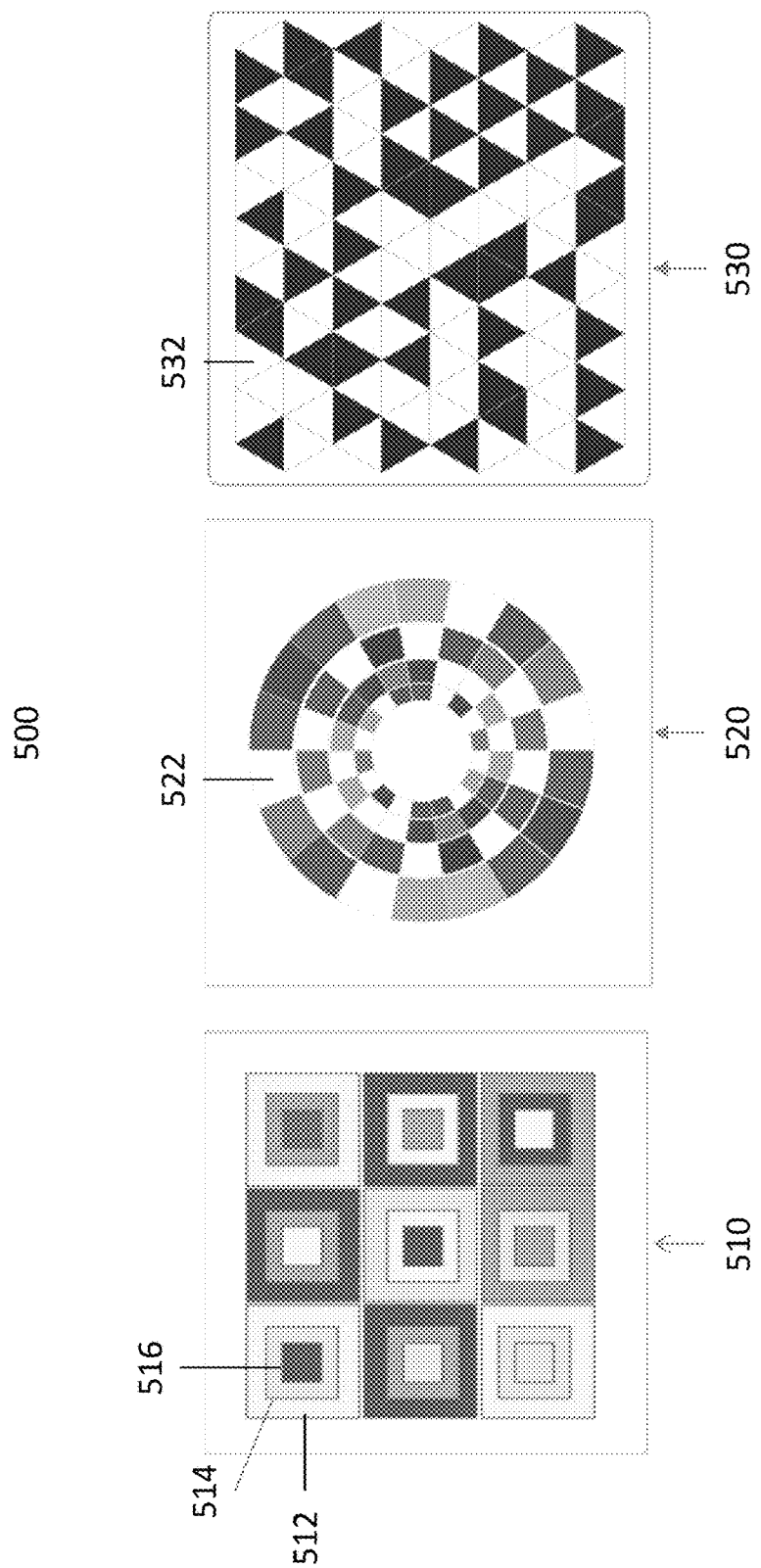

SYSTEMS AND METHODS FOR TIME CHANGING DYNAMIC SECURITY CODE

CROSS-REFERENCE TO RELATED PATENT APPLICATION

This present application claims the priority of Indian Patent Application No. 2489/CHE/2014, filed on May 19, 2014, and entitled "SYSTEMS AND METHODS FOR TIME CHANGING DYNAMIC SECURITY CODE". The entire contents of the which is herein incorporated by reference.

BACKGROUND

The following description is provided to assist the understanding of the reader. None of the information provided or references cited is admitted to be prior art.

Current security codes and authentication codes are static, easily tampered with, and expensive. Further, technologies such as barcodes, quick response (QR) codes, and holograms can be easily replicated by off the shelf technology easily available in the market. Some highly secure technologies, such as deoxyribonucleic acid (DNA) and chemical taggants are dependent upon complex and expensive reader technologies, for example forensic methods for DNA tags and spectroscopy for chemical taggants.

SUMMARY

The present technology provides a dynamic security code system. The system includes a base layer including a first pattern and a sublimating compound layer including a plurality of materials selectively covering the base layer to form a security code. The plurality of materials are configured to sublimate at respective sublimation rates. The system further includes a shielding layer configured to shield the base layer and the sublimating compound layer to form a security code. The shielding layer is configured to control a diffusion rate of the plurality of materials through the shielding layer such that the security code is changed. In some embodiments, the first pattern includes a grid formation. The plurality of materials can include different colors. In some embodiments, the plurality of materials includes different compounds. In an embodiment, each of the different compounds has a different sublimation rate. In some embodiments, the plurality of materials includes at least one of a heterocyclic organic compound and an organometallic compound.

In some embodiments, the shielding layer is configured to control a difference between a saturated vapor pressure and a partial pressure in a bulk vapor that accumulates over the sublimating compound layer. The shielding layer may include a permeable material configured to allow a build-up of a local vapor pressure. In an embodiment, an overall rate of disappearance of the plurality of materials in the sublimating compound layer can be based on the respective sublimation rates and the diffusion rate of the plurality of materials through the shielding layer.

The system further includes a selectively-removable protective layer configured to prohibit sublimation of the plurality of materials. In some embodiments, the sublimating compound layer and the shielding layer are coupled to the base layer via at least one of a direct adhesion and an intermediate material. In an embodiment, the base layer includes deposition cavities to couple the sublimating compound layer and the shielding layer to the base layer.

The system further includes a scanner configured to read the security code based upon an algorithm and a database configured to store a record of a chronological pattern of the security code. The system further includes a processor executing on a reference database. The processor can be configured to generate an array of pre-determined chronological images scan of the security code. The processor can be configured to compare the scan of the security code to the array of pre-determined chronological images and authenticate the security code based upon the comparison.

The present technology also provides an illustrative method of creating a dynamic security code. The method includes creating a base layer including a first pattern and selectively covering the base layer with a sublimating compound layer including a plurality of materials. The plurality of materials is configured to sublimate at respective sublimation rates. The method further includes shielding the base layer and the sublimating compound layer with a shielding layer to form a security code. The shielding layer is configured to control a diffusion rate of the plurality of materials through the shielding layer such that the security code is changed.

The method further includes creating the first pattern in a grid formation. In some embodiments, the plurality of materials includes different colors. In an embodiment, the plurality of materials includes different compounds. Each of the plurality of materials has a different sublimation rate. In an embodiment, the plurality of materials includes at least one of a heterocyclic organic compound and an organometallic compound.

The method further includes controlling, by the shielding layer, a difference between a saturated vapor pressure and a partial pressure in a bulk vapor that accumulates over the sublimating compound layer. The shielding layer includes a permeable material configured to allow a build-up of a local vapor pressure. In an embodiment, an overall rate of disappearance of the plurality of materials in the sublimating compound layer is based on the respective sublimation rates and the diffusion rate of the plurality of materials through the shielding layer.

The method further includes prohibiting, by a selectively-removable protective layer, the sublimation of the plurality of materials. The method includes coupling the sublimating compound layer and the shielding layer to the base layer via at least one of a direct adhesion and an intermediate material. The method further includes coupling deposition cavities to the base layer. The deposition cavities can be configured to couple the sublimating compound layer and the shielding layer to the base layer. In some embodiments, the method includes changing a thickness of the shielding layer to change the diffusion rate of the plurality of materials though the shielding layer. In some embodiments, changing a viscosity of the shielding layer can change the diffusion rate of the plurality of materials though the shielding layer.

The present technology also provides an illustrative method of authenticating a dynamic security code. The method includes acquiring, by a scanner, an image of a security code. The method further includes comparing, by a processor, the image of the security code to an array of pre-determined chronological images. The method further includes authenticating, by the processor, the security code based on the comparison. In an embodiment, the image of the security code matches at least one pre-determined chronological image in the array.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are; therefore, not to be considered limiting of its scope, the disclosure will be described with additional specificity and detail through use of the accompanying drawings.

FIGS. 5A-5C depict alternative grid constructions in accordance with other illustrative embodiments.

DETAILED DESCRIPTION

Figure 1:
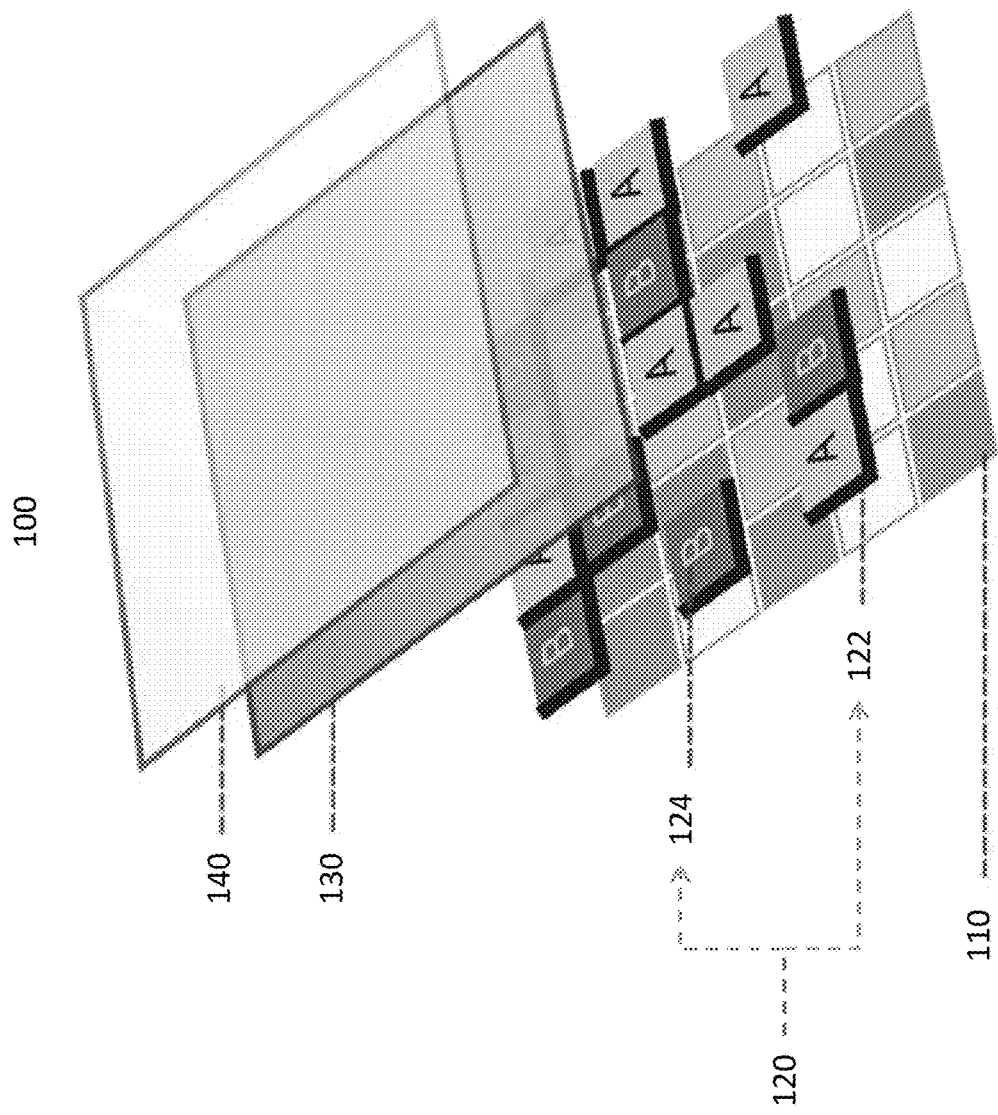
FIG. 1 depicts a dynamic security code system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A covert security code that is dynamic and exhibits time changing behavior starting from its point of application can be used for authentication purposes and as a time changing label. In an embodiment, materials with sublimation characteristics may be used to achieve a time changing behavior. In addition, a layer of permeable material can be disposed over the sublimating materials. The time changing behavior can be a product of the sublimation rate of the materials and the diffusion rate of vapors from the materials through the permeable layer. A sublimating compound in open atmosphere will sublimate with a variable rate. Thus, the permeable layer can serve the dual purpose of inhibiting the atmospheric effect on the sublimating compounds and controlling the diffusion rate of vapors.

For example, a basic code may be constructed in the form of a grid made up of macropixels, where the macropixels are color-coded. A macropixel may be a single point on a graphic image or material, for example a label, pattern, and/or code. In some embodiments, a macropixel may refer to a portion or partition of a larger pattern and/or code. The larger pattern and/or code may include multiple macropixels. In an embodiment, a macropixel may be referred to as a pixel. A macropixel can be of varying shape, size, and/or color. In some embodiments, color-coded macropixels can be covered with a sublimating compound layer of different sublimating materials. The different materials may sublimate at different rates, exposing the macropixels in a random or a predetermined pattern. Accordingly, a scan of the code at time B will look different from the scan of the code at time A. Thus the code can span the valid time scale of the product it is associated with and can also indicate its expiration, for example, in a pharmaceutical product.

This dynamic security code may also be verified over a secure database by a seller or a consumer via a simple scanner. The sublimating compounds and their rates can be custom designed for different time scales. Thus, the code information is secure, changes with time, and is hard to replicate. The technology may be used for labels which can be separately attached or printed on a drug form and/or packaging.

FIG. 1 depicts a dynamic security code system 100 in accordance with an illustrative embodiment. The dynamic security code system 100 may be any type of security code, authentication code, bar code, or quick response (QR) code. Dynamic security code system 100 includes a base layer 110, a sublimating compound layer 120, a shielding layer 130, and a protective layer 140. In an embodiment, the sublimating compound layer 120 includes a selective overlay of material A 122 and a selective overlay of material B 124.

In an embodiment, the base layer 110 may include a grid formation representing a basic code and/or pattern. The grid formation can be constructed to form at least one of a security code, an authentication code, a bar code, or a quick response (QR) code. The grid may be made up of multiple macropixels to create the code. In an embodiment, to create the code, the grid may be made up of macropixels varying in color and/or shape. In an embodiment, the macropixels may include text to create the code. The text may include at least one of symbols, alphabetic characters, and/or numerical characters. Additionally, in other embodiments, the base layer 110 may be configured in various grid formations including macropixels of varying sizes to create different codes, as will be discussed below in regards to FIGS. 5A-5C.

The base layer 110 can form any number of codes and/or patterns based on the number of macropixels in the grid. In some embodiments, the base layer 110 can form any number of codes and/or patterns based on the number of colors, shapes, sizes, and/or text selected for the macropixels. Different codes and/or patterns can be created by changing the number of macropixels in the base layer 110 and/or changing the number of colors, shapes, sizes, and/or text used in the base layer 110.

In an embodiment, the macropixels may be arranged in an organized pattern to form the grid formation. In other embodiments, the macropixels may be randomly arranged to form the grid formation. For example, in one embodiment, the base layer 110 may be made up of a grid of twenty-five macropixels, where the individual macropixels may be one of four different colors.

In an embodiment, the base layer 110 may be the bottom layer of the dynamic security code system 100. The material used in the base layer 110 may include at least one of paper, metal foil, glass, or a fabric. In some embodiments, the material in the base layer 110 may be selected based upon the application where the label will be used. In an embodiment, selected macropixels of the base layer 110 may be covered by the sublimating compound layer 120.

In an embodiment, the sublimating compound layer 120 may include a plurality of materials to selectively cover the base layer 110 to form a security code. In some embodiments, the plurality of materials includes materials with varying sublimation rates. The sublimating compound layer 120 can include materials configured to exhibit a phenomena by which the materials directly convert from a solid phase to a gas phase, thereby skipping the liquid phase. The plurality of materials may be selected to create a pattern that changes over time, resulting in a different pattern (i.e., security code) at various times based upon the varying sublimation rates of the materials used. In some embodiments, the plurality of materials may be opaque. In other embodiments, the plurality of materials may be semi-transparent. The plurality of materials may include different compounds, where each of the compounds has a different sublimation rate, for example, different rates at which the compounds convert from a solid to a gas phase.

In an embodiment, the sequential overlaying of the sublimating materials on the base layer 110 may hide certain, selected macropixels of the base layer 110 to form the security code. In some embodiments, the security code may keep changing at a rate based on the respective sublimation rates of the materials used in the sublimating compound layer 120. In some embodiments, the security code can become more variable and complex based upon the types of materials used and/or the number of materials used in the sublimating compound layer 120.

Materials used in the sublimating compound layer may be selected based on their respective sublimation rates. In some embodiments, the overall rate of disappearance of sublimating compounds can depend on three types of control parameters: intrinsic, extrinsic, and deposition characteristics. The intrinsic parameters include vapor pressure and enthalpy of sublimation.

In an embodiment, the vapor pressure of a compound can be the pressure of a vapor resulting from the sublimation of the compound above a sample of the compound. For example, in one embodiment, the vapor pressure can represent the pressure of a vapor from a material in the sublimating compound layer as the vapor is contained between the sublimating compound layer and the shielding layer. In some embodiments, compounds can be selected based on their vapor pressure at a certain temperature range (e.g., room temperature). In an embodiment, the enthalpy of sublimation refers to the heat required to sublimate one mole of a substance at a given combination of pressure and temperature. The enthalpy of sublimation can be measured in kilojoules per moles (kj/mol). In one embodiment, compounds are selected for the sublimating compound layer based on their respective sublimation enthalpies. For example, table 1 provides a non-limiting list of compounds and their respective vapor pressure at room temperature and sublimation enthalpies. In some embodiments, the sublimating compounds are selected so that their rate of sublimation does not change in an environment of a pre-determined temperature. For example, in one embodiment, the sublimating compounds can be selected such that their sublimation enthalpy and vapor pressure will remain constant at room temperature during a pre-defined time range. The time range may refer to a lifecycle of a time changing label.

In an embodiment, the extrinsic parameters represent the characteristics of the environment to which the shielding layer 130 is exposed, including an external pressure, a temperature, and a diffusion rates across the shielding layer 130. The extrinsic parameters of the environment around the shielding layer 130 can impact the rate of sublimation of materials in the sublimating compound layer. The shielding layer 130 can serve as a barrier to prohibit or allow the extrinsic parameters to impact the sublimation rate.

In an embodiment, the external pressure can be the atmospheric pressure of the environment to which the shielding layer 130 is exposed. In some embodiments, the temperature of the environment around the shielding layer 130 can be controlled by the thermal conductivity and the thickness of the shielding layer 130. In an embodiment, a heat transfer rate across the shielding layer 130 can be controlled by the thermal conductivity of the shielding layer 130 and the thickness of the shielding layer 130. By controlling the heat transfer rate across the shielding layer 130, the temperature to which the sublimating compound layer 120 is exposed can be controlled.

In some embodiments, the diffusion rate across the shielding layer 130 can affect the rate at which vapors permeate through the shielding layer 130. In an embodiment, the diffusion rate can be affected by the viscosity of the shielding layer 130, the thickness of the shielding layer 130, and particle size of the sublimating material. In an embodiment, the viscosity of the shielding layer can be a measurement of a material's resistance to flow. For example, a material with a higher viscosity may slow down the rate at which vapors to permeate through the shielding layer 130. In other embodiments, materials of lower viscosity may increase the rate at which vapors permeate the shielding layer 130.

In an embodiment, the thickness of the shielding layer 130 can affect the diffusion rate. A rate at which a vapor of material diffuses through the shielding layer can be slowed by a thicker shielding layer 130. In other embodiments, the vapor of the same material can have a faster diffusion rate through a thinner shielding layer 130. In an embodiment, the size of the particles in the shielding layer 130 can affect the diffusion rate. In some embodiments, larger size particle corresponds to a shielding layer 130 with a slower diffusion rate. In other embodiments, smaller size particles correspond to a shielding layer 130 with a faster diffusion rate. In one embodiment, the shielding layer 130 may include a polymeric film. The thickness of the film can determine the extent to which vapors of the sublimating compounds are retarded by the shielding layer 130.

In an embodiment, the deposition characteristics can refer to characteristics of materials in the sublimating compound layer 120. The deposition characteristics may include the volume, the surface area, and the thickness of the deposited sublimating material in the sublimating compound layer 120. In some embodiments, the deposition characteristics may refer to a single grid of the sublimating compound layer 120. In other embodiments, the deposition characteristics may refer to the entire sublimating compound layer 120. In an embodiment, the rate of diffusion though a material (e.g., the shielding layer 130) can be affected by the amount and dimensions of a sublimating compound. For example, in one embodiment, a material with a very fast sublimation rate can be used in the sublimating compound layer 120. In such an embodiment, the dynamic security code system 100 would need a higher volume of the material to last the entire intended lifespan. The volume can be an amount of material forming the sublimating compound layer 120. For example, in one embodiment, the volume can refer to the amount of material formed over the base layer 110 to form the sublimating compound layer 120. In other embodiments, the dynamic security code system 100 may have a shorter lifespan and a smaller volume of material may be used.

In some embodiments, a surface area of the sublimating compound layer can be configured based on the intended lifespan of the dynamic security code system 100. In one embodiment, if the material in the sublimating compound layer has a fast sublimation rate, a larger surface area of material may be needed. In other embodiments, if the material in the sublimating compound layer has a slow sublimation rate, a smaller surface area of material may be needed. The surface area may refer to a total area of a surface of a grid in the sublimating compound layer 120. In some embodiments, the surface area may refer to a total area of a surface of the entire sublimating compound layer 120.

In some embodiments, to control the diffusion rate, the thickness of the sublimating compound layer 120 can be formed according to the intended lifespan of the dynamic security code system 100 (e.g., a thick layer, a thin layer). In one embodiment, the thickness may refer to a measurement of the depth of a grid of the sublimating compound layer 120. In other embodiments, the depth may refer to a depth of the entire sublimating compound layer 120.

In other embodiments, to control the diffusion rate, the thickness of the shielding layer 130 can be increased or decreased. A thicker shielding layer can reduce the diffusion of vapors from the sublimating compound layer 120 through the shielding layer 130. A thinner shielding layer can increase the diffusion rate of vapors from the sublimating compound layer 120 through the shielding layer 130. In some embodiments, to control the diffusion rate, the viscosity of the shielding layer 130 can be increased or decreased. A higher viscosity can reduce the diffusion rate of vapors from the sublimating compound layer 120 through the shielding layer 130. A lower viscosity can increase the diffusion rate of vapors from the sublimating compound layer 120 through the shielding layer 130.

In an embodiment, the parameters and the importance of each parameter used for selecting materials for the sublimating compound layer 120 varies depending on the desired lifetime of the time changing code. This lifetime may vary from a few days for short shelf life products, for example, perishable food products like dairy products and fast moving consumer goods (FMCG) to a few years for long shelf life products, for example, medicinal packaging, consumer goods, etc.

In an embodiment, the materials selected for the sublimating compound layer 120 may belong to a class of heterocyclic organic compounds and/or organometallic compounds. The sublimating compound layer 120 may include any synthetic and non-synthetic compound which has and/or exhibits sublimation behavior. In an embodiment, the sublimation behavior may be based upon the sublimation characteristics at room temperature (i.e., above 25° C.) and at atmospheric pressure (i.e., 1 atm). In some embodiments, the materials may have a melting point in the range of about 50 degrees Celsius to about 70 degree Celsius. In an embodiment, to select a material for the sublimating compound layer 120, the selection may be based on the sublimation rate of the materials and operating conditions for the materials. The sublimation may depend on both intrinsic and extrinsic properties of the materials. Table 1 provides a chart listing materials that may be used in the sublimating compound layer 120 and their characteristics.

TABLE 1

| Name of compound | Apperance at RT (25 °C.) | Molecular struture | Molecular formula | Molecular weight | Melting point | Enthalpy of sublimation (Kj/Mole) | Vapor pressure at 25° C. (Pa) | Other properties |
|---|---|---|---|---|---|---|---|---|
| Cyclododecane | White waxy solid | 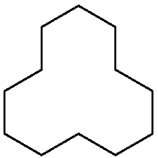 [SMILES: C1CCCCCCCCCCC1] | C12H24 | 168.3 | 58-60 | 76 | 10 | Volatile Adhesive, binder |
| Napthalene | White, crystalline | 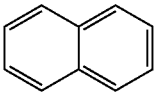 | C10H8 | 128.18 | 80 | 72 | 11 | |
| Paradichlorobenzene | colorless to white solid crystalline | 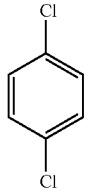 | C6H12Cl2 | 147 | 52 | 65 | 53 | |

TABLE 1-continued

| Name of compound | Apperance at RT (25 °C.) | Molecular struture | Molecular formula | Molecular weight | Melting point | Enthalpy of sublimation (Kj/Mole) | Vapor pressure at 25° C. (Pa) | Other properties |
|---|---|---|---|---|---|---|---|---|
| Benzoic acid | colorless/white crystalline solid | | C7H6O2 | 122.12 | 122 | 89 | 0.1 | |
| Camphor | White chunks | | C10H16O | 152.23 | 176 | 51 | 86 | |
| Ferrocene | orange crystalline | | C10H10Fe | 186.04 | 173 | 74 | 1.16 | |
| Camphene | White waxy solid | | C10H16 | 136.24 | 50 | 47 | 450 | |
| 4-Chloroaniline | Pale yellow | | C6H6ClN | 127.57 | 70 | 90 | 2 | |
| Azulene | Dark blue | | C10H8 | 128.17 | 99 | 76 | 1 | |

In one embodiment, the selection criteria may select materials with a vapor pressure at room temperature ranging from about 0.1 mm of Mercury (Hg) to about 1.0 mm Hg and a melting point of about 60° Celsius (C) to about 70° C. For example and without limitation, the sublimating compound layer 120 may include Cyclododecane and/or Naphthalene. Table 2 is a chart displaying the characteristics of Cyclododecane and Naphthalene around room temperature.

TABLE 2

| | Deposition Breadth (cm) | Deposition Width (cm) | Deposition Height (cm) | Deposition Volume (cm$^3$) | Compound Density |
|---|---|---|---|---|---|
| Cyclododecane | 0.5 | 0.5 | 0.2 | 0.05 | 0.78 |
| Naphthalene | 0.5 | 0.5 | 0.2 | 0.05 | 0.99 |

| | Deposited Mass (gm) | Time for Sublimation (seconds) | Time for Sublimation (days) |
|---|---|---|---|
| Cyclododecane | 0.039 | 1300000 | 15 |
| Naphthalene | 0.0495 | 4950000 | 57 |

In some embodiments, the materials in the sublimating compound layer 120 may be selected based upon the environment the dynamic security code system 100 may be exposed to, for example an open environment setting or controlled environment setting. In another embodiment, at least one of the materials in the plurality of materials may be synthesized and/or generated from existing materials. In one embodiment, the material may be generated to have a desired sublimation rate.

The Knudsen-Langmuir equation is represented in equation 1 (Eq. 1) below. This model helps predict the maximum possible sublimation of a respective material. In some embodiments, the practically observed rates may be lesser than the predicted maximum sublimation rate. In Eq. 1, $P_v^H$=the saturated vapor pressure, $P_v$=the partial pressure, $M_v$=the vapor molecular mass, R=is the universal gas constant, $T_w$=is the temperature, and A is the evaporation coefficient.

$$G_v \frac{a(p_v^H - p_v)}{\sqrt{\frac{2\pi RT_w}{M_v}}} \quad \text{Eq. (1)}$$

In an embodiment, the sublimation rate for the materials in the sublimating compound layer 120 may be estimated according to the Knudsen model. In the Knudsen model, the mass flow rate of a substance during sublimation may be defined by the difference between the saturated vapor pressure, $P_v^H$, which applies at the interface and the partial pressure in the bulk vapor, $P_v$. In an embodiment, the sublimation rate of materials in the sublimating compound layer 120 may be controlled by selecting a material of low vapor pressure and/or by a pressure layer overlaid on to the surface of the sublimating compound layer, for example by the shielding layer 130.

The vapors of the materials in the sublimating compound layer 120 can permeate the shielding layer 130. The diffusion rate of vapors through the shielding layer 130 can be based upon factors such as a concentration gradient, viscosity of the substrate used in the shielding layer 130, temperature, and particle size. For example, in one embodiment, the shielding layer 130 may include a polymeric film. The thickness of the polymeric film can determine the diffusion rate of vapors through the shielding layer 130.

In an embodiment, to control the rate of sublimation and the rate of diffusion of the vapors, the shielding layer 130 is configured to control a difference between a saturated vapor pressure and a partial pressure in a bulk vapor that accumulates over the sublimating compound layer 120. The difference between the saturated vapor pressure which applies at the interface and the partial pressure in the bulk vapor can, in some embodiments, define the driving potential to cause sublimation. In an embodiment, the higher the difference between the saturated vapor pressure which applies at the interface, and the partial pressure in the bulk vapor, the higher the rate of sublimation. In some embodiments, by allowing local build-up of partial pressure and ensuring that the sublimating vapor accumulates as bulk vapor over the subliming surface, this parameter can be controlled.

In an embodiment, the shielding layer 130 includes a permeable material configured to allow build-up of a local vapor pressure. The shielding layer 130 can be configured to control the rate at which vapors of the sublimating compound layer 120 permeate through the shielding layer 130. The permeable cover can selectively allow air to pass through and trap the sublimated components to build a local vapor pressure and accordingly, slow down the rate of sublimation. In an embodiment, the shielding layer 130 may create a microenvironment for the materials of the sublimating compound layer 120 so that they sublimate at predetermined rates.

In some embodiments, the shielding layer 130 may include hydrophilic membranes to control vapor permeation, for example, polyvinyl alcohol (PVA), polyacrylonitryle (PAN), and/or polyvinylpyrrolidone (PVPD). In other embodiments, the shielding layer 130 may include hydrophobic membranes to control vapor permeation, including polydimenthylsiloxane (PDMS), polyvinylidene fluoride (PVDF) and/or polytetrafluoroethylene (PTFE).

In an embodiment, the shielding layer 130 may be configured to shield the base layer 110 and the sublimating compound layer 120. In additional embodiments, the shielding layer 130 may act as a protective layer to prevent the sublimating compounds from responding to unwanted environmental changes that occur. In other embodiments, the shielding layer 130 may prevent wear and tear, tampering, or unintentional damage to the dynamic security code system 100.

In an embodiment, the dynamic security code system 100 may further include the protective layer 140. In some embodiments, the protective layer 140 may be configured to prohibit sublimation of the dynamic security code system 100. In an embodiment, the protective layer 140 may be the top layer of the dynamic security code system 100, disposed and/or placed over the shielding layer 130. The protective layer 140 may include materials such as aluminum foil and/or polyethylene film. In one embodiment, the polyethylene film may be high density polyethylene film. In some embodiments, the protective layer 140 may be a peel-able protective sheet which can prevent any kind of sublimation. In an embodiment, the dynamic security system 100 may be considered inactive if the protective layer 140 is disposed over the shielding layer 130. In an additional embodiment, when the protective layer 140 is peeled off the dynamic security code may become active and the materials in the sublimating compound layer 120 may begin sublimation.

Figure 2:
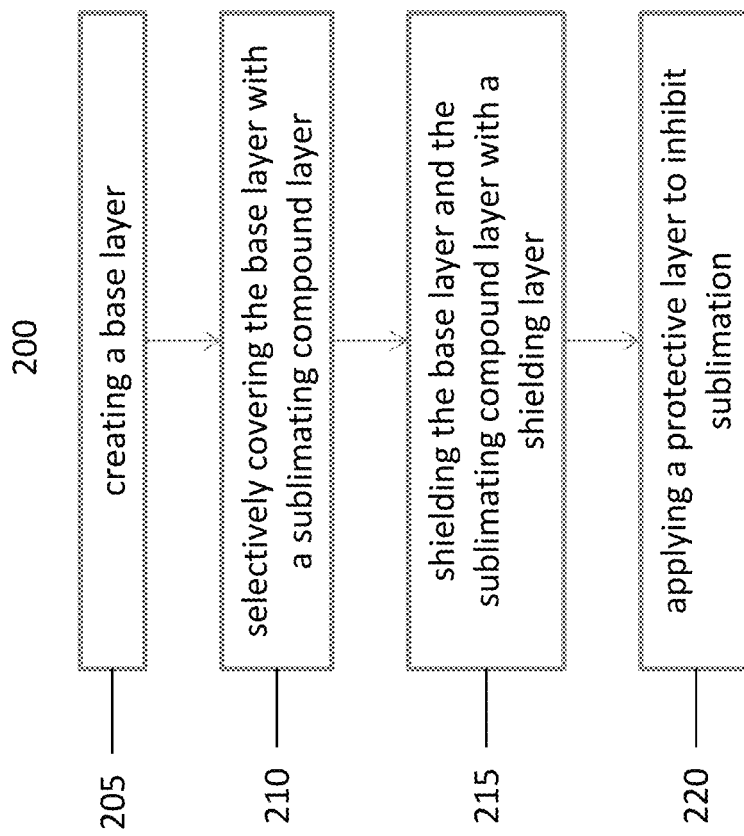
FIG. 2 depicts a flow diagram of a method for creating a dynamic security code system in accordance with an illustrative embodiment.

FIG. 2 depicts a flow diagram of a method 200 for creating a dynamic security code in accordance with an illustrative embodiment. In an operation 205 (creating a base layer), the base layer is created by forming a grid of macropixels to represent a code and/or pattern. In some embodiments, the base layer may be created by forming a grid of macropixels on a substrate. In an embodiment, the substrate may have a grid of macropixels drawn onto the substrate. In other embodiments, to create the base layer, a grid of macropixels may be printed on the substrate. In still other embodiments, the macropixels may be affixed to the substrate to form the base layer. In an embodiment, the pattern may include a grid formation of macropixels of varying color.

In one embodiment, the first pattern may include a grid formation of twenty-five macropixels. The individual macropixels may be made up of four different colors. In some embodiments, the grid of macropixels may be formed in varying shapes, sizes, and colors with a varying number of pixels. For example and without limitation, the grid may be a square shape, a circular shape, a triangular shape, or a rectangular shape. In some embodiment, the macropixels themselves may be of varying shapes and sizes. For example and without limitation, the macropixels may be square shape, circular shape, triangular shape, or rectangular shape.

In an operation 210 (selectively covering the base layer with a sublimating compound layer), selected macropixels in the base layer are overlaid with a sublimating material to form a security code. In some embodiments, the sublimating material used in the sublimating compound layer may include any material with sublimating characteristics. In an embodiment, the sublimating compounds may be a solid compound. In some embodiments, the sublimating materials may be chosen based on their respective sublimation rates. In an embodiment, the sublimating materials may be of varying color.

In some embodiments, the macropixels of the base layer may be selectively covered so that some macropixels are hidden and some macropixels are exposed. To selectively cover the macropixels of the base layer, the sublimating materials of the sublimating compound layer may be applied over selected macropixels. The sublimating materials may be affixed to the macropixels of the base layer.

The sublimating materials may be affixed to the base layer in at least three ways. In an embodiment, the sublimating materials may be directly affixed to the base layer. For example, if the sublimating material has a very slow sublimation rate, the quantity of material to be deposited will be very low. In such cases, a vapor deposition technique may be used. In one example, if Naphthalene is used as the sublimating material, the surface of the base layer may be treated to create a rough surface. In one embodiment, the surface of the base layer may be modified using any known etching method. Then the Naphthalene may be directly coated onto the rough surface of the base layer. In another example embodiment, if Cyclododecane is used as the sublimating compound mater, the Cyclododecane may be directly affixed to the surface of the base layer without prior treatment to the surface of the base layer.

In another embodiment, the sublimating materials may be affixed to the base layer using an intermediate material. The intermediate material can create better adhesion of the sublimating compounds to the base layer. For example, activated carbon may be used as an intermediate material because it is a good adsorbent for many organic compounds. The base layer may include or may be treated with activated carbon fibers to create a surface for depositing sublimating materials by vapor deposition. Additionally, the activated carbon may come in a variety of colors.

Figure 8A:
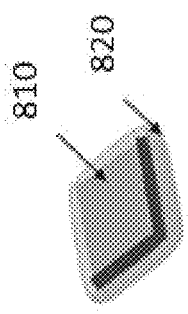
FIG. 8A depicts an illustration of a sublimating compound in pellet form in accordance with an illustrative embodiment.
Figure 8B:
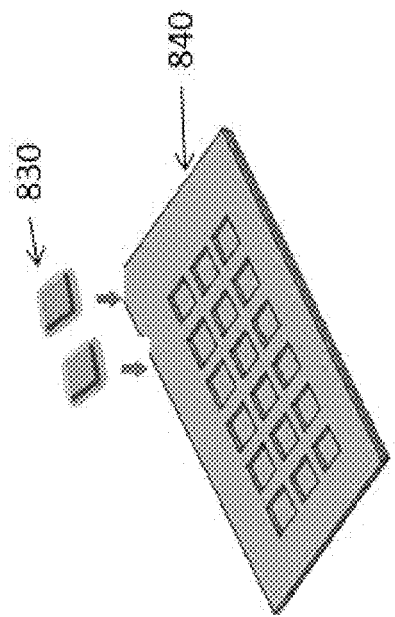
FIG. 8B depicts an illustration of a sublimating compound deposited into a cavity formed in a base layer in accordance with an illustrative embodiment.

In still additional embodiments, the sublimating materials may be deposited into cavities within the base layer. This technique may be used when the sublimating compound layer includes materials with high sublimation rates (i.e., fast sublimation rates). The volume of the cavities can be shaped to form a cubical pellet or disk of a desired shape. For example, FIG. 8A illustrates one embodiment of a sublimating compound in pellet form 810. The sublimating compound 810 is then encapsulated in a shielding material 820. In an embodiment, the combination of the sublimating compound 810 encapsulated in the shielding material 820 can be affixed directly to the surface of the base layer. In some embodiments, as illustrated in FIG. 8B, the combination 830 of the sublimating compound 810 encapsulated in the shielding material 820 can be deposited into a cavity 840 formed in the base layer.

In some embodiments, the combination of the sublimating layer and the base layer may result in an observable pattern. In an embodiment, the base layer may be selectively covered by sublimating materials with varying sublimation rates. In an additional embodiment, the observable pattern may change over time as sublimating materials in the sublimating compound layer sublimate and expose macropixels underneath.

Referring back to FIG. 2, in an operation 215 (shielding the base layer and the sublimating compound layer with a shielding layer), the base layer and the sublimating compound layer are covered with a shielding layer to form a security code. In some embodiments, the shielding layer may be applied over the base layer and the sublimating compound layer. In other embodiments, the shielding layer may be affixed to the base layer and the sublimating compound layer. In one embodiment, the shielding layer may include an adhesive to secure the materials in the shielding layer to materials in both the base layer and the sublimating compound layer. The shielding layer can be configured to control a diffusion rate of the plurality of materials from the sublimating compound layer through the shielding layer such that the security code is changed over time. The shielding layer may control a difference between a saturated vapor pressure and a partial pressure in a bulk vapor that accumulates over the sublimating compound layer. In some embodiments, the shielding layer may include a permeable material configured to allow a build-up of local vapor pressure.

In an operation 220 (applying a protective layer to inhibit sublimation), a protective layer is applied over the shielding layer. In some embodiments, the protective layer may be applied over the shielding layer. In other embodiments, the protective layer may be affixed to the shielding layer. In one embodiment, the protective layer may include an adhesive to secure the protective layer to the shielding layer. In some embodiments, the protective layer may include a peel-able material. In an embodiment, the protective layer may prohibit the sublimation of the plurality of materials in the sublimating compound layer. In some embodiments, when the protective layer is disposed over the shielding layer the dynamic security code may be inactive. In an embodiment, the protective layer may be selectively removable. In some embodiment, when the protective layer is removed the dynamic security code may be activated and the materials in the sublimating compound layer may begin sublimating.

In some embodiments, a reading system may scan and/or read the dynamic security code. The reading system may be any kind of device for examining, reading, or scanning a code and/or pattern. In one embodiment, the reading system may be a scanner. The scanner can acquire an image of the security code and transmit the image to a database on a server. In some embodiments, the reading system may be hand-held. The reading system may include an image capture device capable of reading a code and/or pattern, for example a bar code. In one embodiment, the image capture device can be a three-dimensional (3D) camera configured to take a 3D image of the security code. In an embodiment, the image capture device may include a charge coupled device (CCD) array. The CCD array may be a collection of light sensitive diodes. In an embodiment, the reading system may capture images of the entire spectrum of visible light. In other embodiments, the reading system may capture limited spectrum images, for example, an infrared image or an ultraviolet image.

The reading system may further include a processor and a database. The processor can be configured to process the images of the security code and authenticate the security code. The database can include an authentication algorithm, for example authentication algorithm described below with respect to FIG. 9. In an embodiment, the processor of the reading system may be configured to read the dynamic security code at different times to detect a change in an observable pattern. In some embodiments, the processor may further include an algorithm module, for example authentication algorithm 900 described below with respect to FIG. 9. In an embodiment, the processor may read the observable pattern of the dynamic security system based upon the algorithm stored in the algorithm module. The processor can generate an array of pre-determined chronological images of the security code. In some embodiments, the processor can be configured to record a chronological order of patterns of the dynamic security system. The processor can compare the received images to the generated pre-determined chronological images of the security code to authenticate the security code. n some embodiments, the processor may be configured to transmit the chronological order of patterns to a database on a remote server.

In further embodiments, a database may receive a record of a chronological pattern corresponding to the dynamic security code from the reading system. In an embodiment, the chronological pattern may correspond to readings and/or scans taken of the dynamic security code at various times. In some embodiments, the database may be configured to store the chronological order of patterns corresponding to the dynamic security code. In an embodiment, the database may be configured to identify when a material in the sublimating compound layer has completely sublimated by reading one of the patterns. In some embodiments, the database may be configured to classify each pattern in the chronological order of patterns by identifying completed events. The completed events may correspond to a time period when one of the materials in the sublimating compound layer has completely sublimated.

Figure 3:
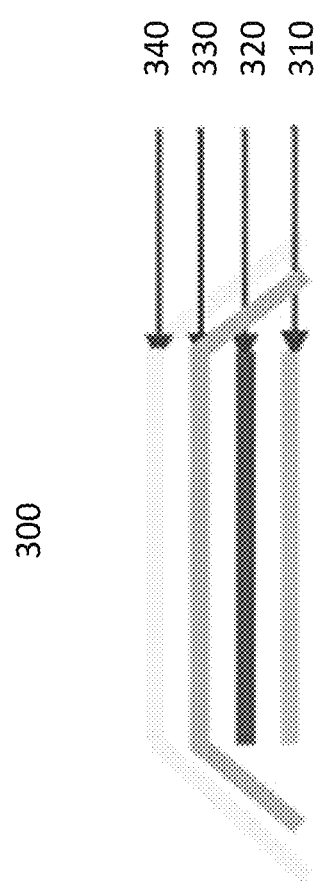
FIG. 3 depicts a cross-sectional view of a dynamic security code system in accordance with another illustrative embodiment.

FIG. 3 depicts a cross-sectional view of a dynamic security code system 300 in accordance with another illustrative embodiment. The dynamic security code system 300 includes a base layer 310, a sublimating compound layer 320, a shielding layer 330, and a protective layer 340. As illustrated in FIG. 3, in an embodiment, the base layer 310 may be the bottom layer of the dynamic security code system 300. The base layer 310 may include a grid of macropixels, arranged in such a way to form a code. In some embodiments, the grid of macropixels may be printed onto a substrate. In other embodiments, the grid of macropixels may be affixed to a substrate to create the base layer 310. The sublimating compound layer 320 may be the second layer of the dynamic security code system 300. The sublimating compound layer may include a plurality of materials selectively covering and/or disposed over selected macropixels of the base layer 310. In some embodiments, the sublimating compound layer 320 is disposed between the base layer 310 and the shielding layer 330.

In an embodiment, the shielding layer 330 may be the third layer of the dynamic security code system 300. The shielding layer may be disposed over the sublimating compound layer 320 and the base layer 310 to shield and protect the sublimating compound layer 320 and the base layer 310. In some embodiments, the shielding layer 330 may be disposed between portions of the sublimating compound layer 320 and the base layer 310, as well as the protective layer 340. In an embodiment, the protective layer 340 may be the fourth layer of the dynamic security system 300. The protective layer 340 may inhibit sublimation of any materials in the dynamic security code system 300. In an embodiment, once the protective layer 340 is removed the dynamic security code system 300 may become active. In some embodiments, the dynamic security code system 300 may be referred to as active when the sublimating compound layer 320 begins to sublimate. The dynamic security code system 300 may exhibit a time changing behavior when it is active.

Figure 4:
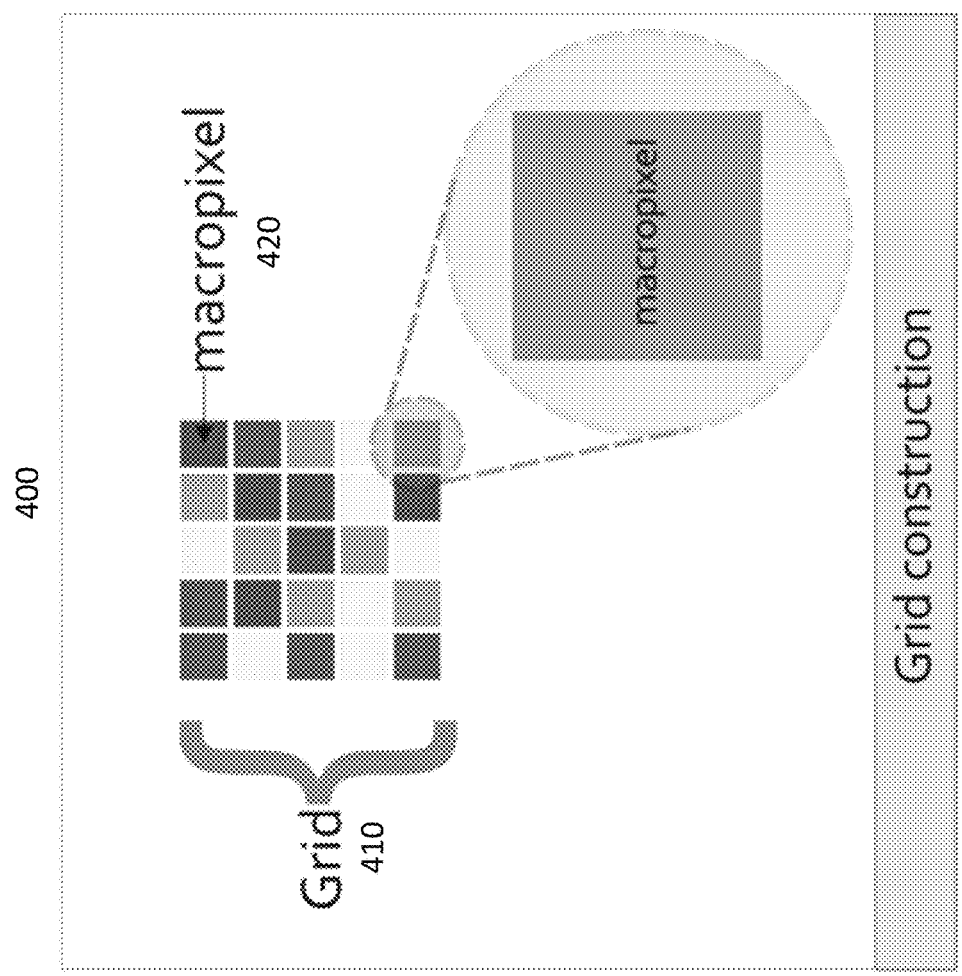
FIG. 4 depicts a grid construction of macropixels in accordance with one illustrative embodiment.

FIG. 4 depicts a grid construction 400 of macropixels in accordance with one illustrative embodiment. Grid construction 400 includes a grid 410 made up of a plurality of macropixels 420. In an embodiment, the plurality of macropixels may be arranged to create a square grid 410. In some embodiments, the individual macropixels 420 may be of varying color to create a code and/or pattern. The macropixels 420 can be of varying shape and sizes. In some embodiments, for example and without limitation, the macropixels may be a square shape, a circular shape, a triangular shape, a rectangular shape, or any other desirable shape. In an embodiment, the size of the grid 410 may depend at least on the number of macropixels 420, the size of the macropixels 420 and/or the shape of the macropixels 420.

FIGS. 5A-5C depict alternative grid constructions in accordance with other illustrative embodiments. The grid constructions illustrated in FIGS. 5A-5C are not meant to represent all of the possible grid constructions but rather possible embodiments. A grid may be constructed in various additional shapes and sizes.

FIG. 5A depicts a first alternative grid construction 510 in accordance with an illustrative embodiment. In an embodiment, the grid construction 510 may include a plurality of macropixels 512 arranged to form a square shape. In some embodiments, the macropixels 512, 514, 516 may be concentric to one another, for example the macropixels 512 may include two smaller macropixels 514, 516 inside of the larger macropixel 512 where each square has the same center. For example, in one embodiment, the plurality of macropixels 512 may include a smaller macropixel 514 inside of or on top of macropixel 512. Further, in an embodiment, the macropixel 514 may include a smaller macropixel 516 inside of or on top of macropixel 514. In some embodiments, the different size macropixels 512, 514, 516 may be different colors.

FIG. 5B depicts a second alternative grid construction 520 in accordance with an illustrative embodiment. In an embodiment, the grid construction 520 may include a plurality of macropixels 522 arranged to form a circle shaped grid 520. In some embodiments, the macropixels 522 may be arranged to form several concentric circles. The macropixels 522 may be of varying size and/or color. In one embodiment, the macropixels 522 may be a rectangular shape.

FIG. 5C depicts a third alternative grid construction 530 in accordance with an illustrative embodiment. In an embodiment, the grid construction 530 may include a plurality of macropixels 532 arranged to form a generally square shaped grid 530. In some embodiments, the macropixels 532 may be a triangular shape. In an embodiment, the macropixels 532 may be of varying colors to create a code and/or pattern.

As stated above, a grid may be constructed in various additional shapes and sizes, for example, the grid may be constructed to form at least one of a security code, an authentication code, a bar code, or a quick response (QR) code. The various grid constructions can form a covert security code that is dynamic and exhibits time changing behavior starting from its point of application and be used for authentication purposes and as a time changing label. In some embodiments, the at least one security code, authentication code, bar code, or quick response (QR) code can be selectively covered by materials with sublimation characteristics used to achieve a time changing behavior. In addition, a layer of permeable material can be disposed over the sublimating materials. The time changing behavior can be a product of the sublimation rate of the materials and the diffusion rate of vapors from the materials through the permeable layer.

Figures 6A, 6B:
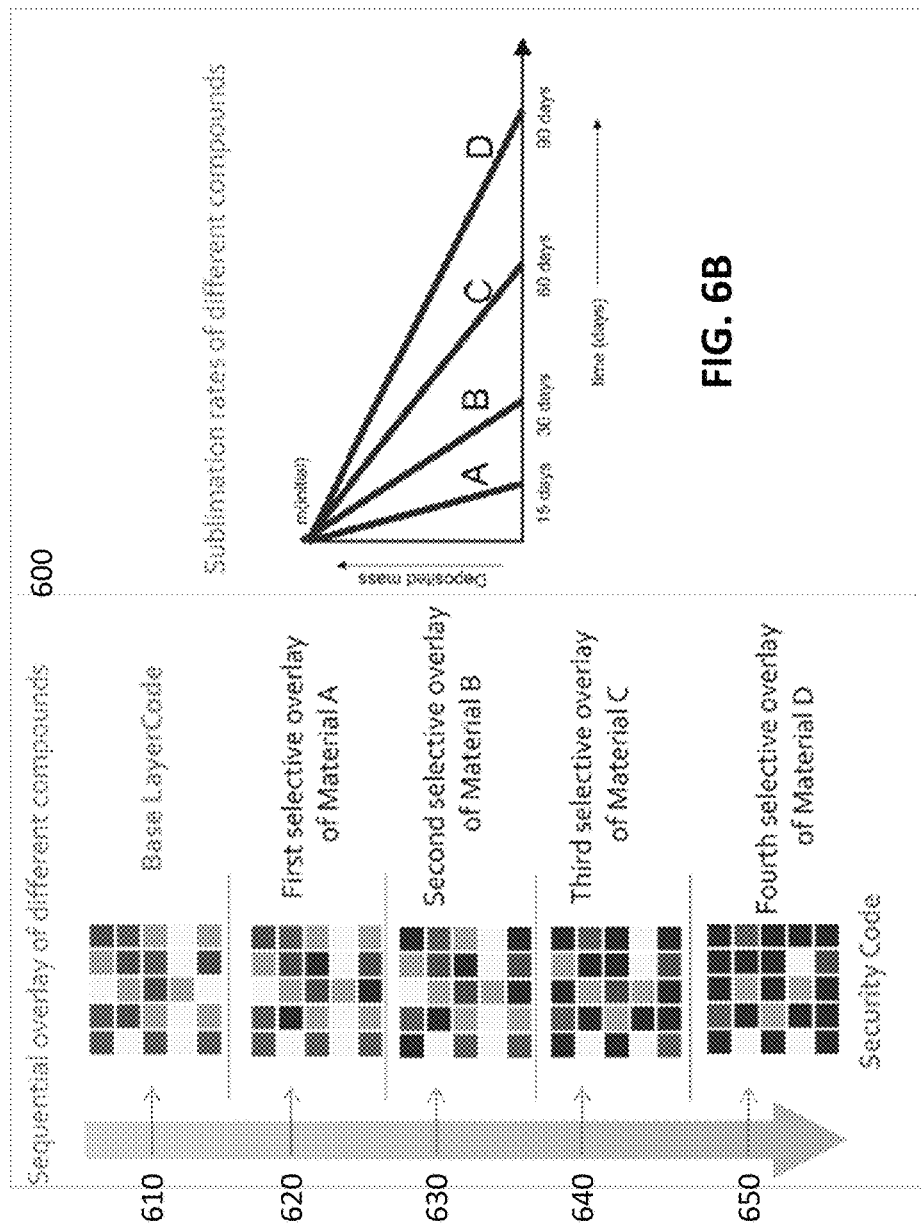
FIG. 6A depicts the creation of a dynamic security code system in accordance with another illustrative embodiment.
FIG. 6B is a graph illustrating sublimation rates of different materials for use in a dynamic security code system. The x-axis is time in days. The y-axis is the deposited mass (m) of the respective material.

FIG. 6A depicts the creation of a dynamic security code system 600 in accordance with another illustrative embodiment. The dynamic security code system 600 includes a base layer 610, a first selective overlay of material A 620, a second selective overlay of material B 630, a third selective overlay of material C 640, and a fourth selective overlay of material D 650. In an embodiment, the base layer 610 may include a grid of macropixels arranged to form a code and/or pattern. The macropixels may be different colors. For example, in one embodiment, the macropixels may vary between a total of four different colors to create the code. In an embodiment, the base layer 610 may be selectively covered by materials A, B, C, and D. In some embodiments, the materials A, B, C, and D may be part of a sublimating compound layer. In an embodiment, materials A, B, C, and D may have different sublimation rates.

In an embodiment, the base layer 610 may be selectively covered with the first selective overlay of material A 620. In some embodiments, the first selective overlay of material A 620 may cover selected and/or predetermined macropixels of base layer 610. In an embodiment, material A may be selected based upon its respective sublimation rate. For example, material A may have a sublimation rate such that after the time period for its respective sublimation rate has expired, the macropixels of base layer 610 covered by material A are exposed.

In an embodiment, the base layer 610 may be covered with the second selective overlay of material B 630. In some embodiments, the second selective overlay of material B 630 may cover selected and/or predetermined macropixels of base layer 610. In an embodiment, material B may be selected based upon its respective sublimation rate. For example, material B may have a sublimation rate such that after the time period for its respective sublimation rate has expired, the macropixels of base layer 610 covered by material B are exposed. Thus, by selecting materials with different sublimation rates, portions of the base layer 610 may become exposed at different times. In some embodiments, each material in the sublimating compound layer may have a different sublimation rate and selectively cover a different portion of the base layer 610. As the different materials in the sublimating compound layer sublimate, the respective portions of the base layer 610 that they selectively covered may become exposed. For example, once material A and material B have sublimated, the base layer 610 may be only selectively covered by the material C and material D.

In an embodiment, the base layer 610 may be covered with the third selective overlay of material C 640. In some embodiments, the third selective overlay of material C 640 may cover selected and/or predetermined macropixels of base layer 610. In an embodiment, material C may be selected based upon its respective sublimation rate. For example, material C may have a sublimation rate such that after the time period for its respective sublimation rate has expired, the macropixels of base layer 610 covered by material C are exposed.

In an embodiment, the base layer 610 may be covered with the fourth selective overlay of material D 650. In some embodiments, fourth selective the overlay of material D 650 may cover selected and/or predetermined macropixels of base layer 610. In an embodiment, material D may be selected based upon its respective sublimation rate. For example, material D may have a sublimation rate such that after the time period for its respective sublimation rate has expired, the macropixels of base layer 610 covered by material D are exposed.

In an embodiment, the base layer 610 may be selectively covered by materials A, B, C, and D in any order. In some embodiments, material A may be overlaid first. In other embodiments, material B may be overlaid first. In another embodiment, material C may be overlaid first. In still another embodiment, material D may be overlaid first. In some embodiments, the number of materials used to cover selected macropixels of the base layer 610 may vary from at least one material up to the total number of macropixels in the base layer 610.

In an embodiment, the materials A, B, C, and D may be selected based upon their different sublimation rates to create a dynamic security code that exhibits time changing behavior. In some embodiments, the dynamic security code may be designed to change at a predetermined rate. For example, in one embodiment, material A may have a sublimation rate of 15 days, material B may have a sublimation rate of 30 days, material C may have a sublimation rate of 60 days, and material D may have a sublimation rate of 90 days. In this embodiment, the dynamic security code 600 may appear as a first pattern initially at day 0, then may appear as a second pattern on day 15 when material A has sublimated, then may appear as a third pattern on day 30 when material B has sublimated, then may appear as a fourth pattern on day 60 when material C has sublimated, and finally appear as a fifth pattern on day 90 when material D has sublimated. In an embodiment, after day 90, the fifth pattern may be the same as the code of the base layer 610 as all of the materials in the sublimating compound layer has sublimated.

FIG. 6B is a graph illustrating sublimation rates of different materials in a dynamic security code system. The x-axis is time in days. The y-axis is the deposited mass (m) of the respective material. The sublimation rate represents the time for a mass of a compound to transition from a solid state to a gas state without passing through an intermediate liquid state. As detailed in FIG. 6B, material A has a sublimation rate of 15 days, material B has a sublimation rate of 30 days, material C has a sublimation rate of 60 days, and material D has sublimation rate of 90 days.

Figure 7:
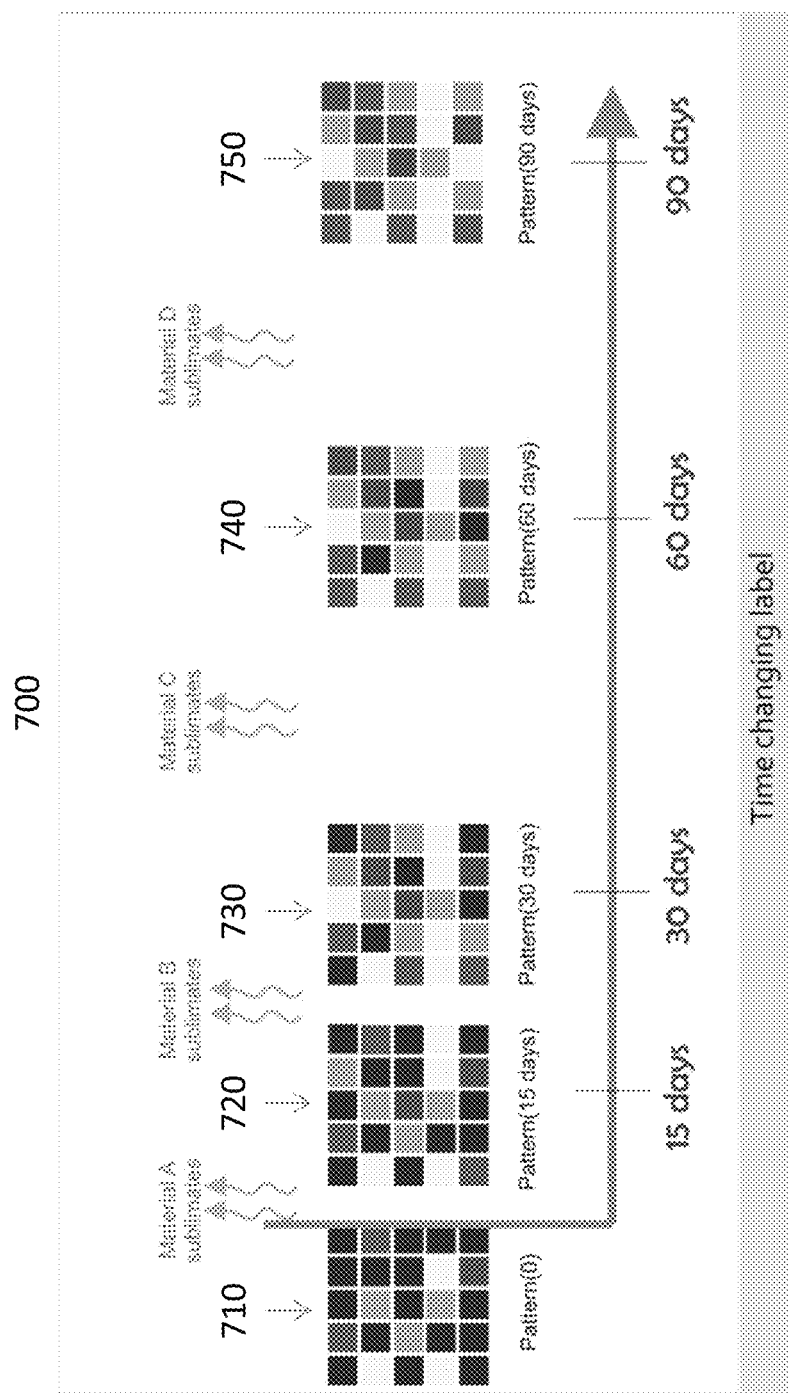
FIG. 7 depicts changes in a dynamic security code system over time in accordance with another illustrative embodiment.

FIG. 7 depicts changes in a dynamic security code system 700 over time in accordance with another illustrative embodiment. As detailed in FIG. 7, the dynamic code system 700 is shown at various stages during a 90 day period and illustrates one embodiment of a time changing label. In some embodiments, with the progression of time, the sublimating materials over different macropixels may sublimate at different rates. In an embodiment, due to the varying sublimation rates, an observable pattern of the security code at any given time, where some macropixels are hidden and some macropixels are exposed, is unique to that time. In some embodiments, the changing observable pattern of the security code may generate a chronological order of patterns. In some embodiments, the chronological order of patterns may be scanned by a reading system and transmitted to a database. In an embodiment, the database may confirm the dynamic security code system 700 based on the chronological order of patterns.

In some embodiments, by reading and analyzing the chronological order of patterns associated with the dynamic security code, the original code (e.g., product label) may be identified at any time during the sublimation process and can identify a name of the product, an expiration date of the product, and quantity and batch number of the product or any other useful information. In some embodiments, the materials in the sublimating compound layer and their respective rate of sublimation can be customized for a desired time scale. In an embodiment, the time scale may range from a few days to up to two years. Alternative time scales may be used in alternative embodiments.

FIG. 7 depicts a first pattern 710 at day 0, a second pattern 720 at day 15, a third pattern 730 at day 30, a fourth pattern 740 at day 60, and a fifth pattern 750 at day 90. In an embodiment, each of the first pattern 710, the second pattern 720, the third pattern 730, and the fourth pattern 740 may correspond to a single time changing label at different stages over time. This time period is only meant as an example. In some embodiments, the period of time for the time changing label may be greater than 90 days or less than 90 days. Alternative time periods and time frames are possible in alternative embodiments. In one embodiment, the time period may be selected based upon the product the label identifies. For example and without limitation, a label for a pharmaceutical product may have a time line that correlates to the expiration date and/or life span of the pharmaceutical product.

In an embodiment, the first pattern 710 may represent a base layer selectively covered by materials A, B, C, and D. The materials A, B, C, and D may have different sublimation rates. By using materials with different sublimation rates, a time changing label may have a different observable pattern and/or code at different periods of time. In some embodiments, at day 0, none of the materials have sublimated and the first pattern 710 represents a first security code.

In an embodiment, the second pattern 720 may represent a base layer selectively covered by materials B, C, and D at day 15. In some embodiments, at day 15, material A has sublimated and exposed the macropixels of the base layer previously covered material A. In one embodiment, after material A has sublimated, the second pattern 720 is observable and correlates to a second security code.

In an embodiment, the third pattern 730 may represent a base layer selectively covered by materials C and D at day 30. In some embodiments, at day 30, material B has sublimated and exposed the macropixels of the base layer previously covered by material B. In one embodiment, after material B has sublimated, the third pattern 730 is observable and correlates to a third security code.

In an embodiment, the fourth pattern 740 may represent a base layer selectively covered by material D. In some embodiments, at day 60, material C has sublimated and exposed the macropixels of the base layer previously covered by material C. In one embodiment, after material C has sublimated, the fourth pattern 720 is observable and correlates to a fourth security code.

In an embodiment, the fifth pattern 750 may represent a base layer. In some embodiments, at day 90, material D has sublimated and exposed the macropixels of the base layer previously covered by material D. In one embodiment, after material D has sublimated, the fifth pattern 720 is observable and correlates to a fifth security code.

In another embodiment, the dynamic security code system 700 may further include a reading system. The reading system may be configured to read and scan the dynamic security code 700. The reading system may be a mobile device and may communicate over a network. In an embodiment, the reading system may be a scanner or any type of device for reading patterns and/or codes such as security codes, authentication codes, bar codes, or quick response (QR) codes. In some embodiments, a custom device may be created to read the dynamic security code, for example and without limitation, use in a hospital or field based authentication.

In an embodiment, the reading system may scan the code 700 at various times to record a chronological order of the code 700 as it changes patterns 710, 720, 730, 740, 750. For example, the reading system may scan and transmit a record of the first pattern 710 at day 0, the second pattern 720 at day 15, the third pattern 730 at day 30, the fourth pattern 740 at day 60, and the fifth pattern 750 at day 90. In some embodiments, the reading system may be configured to transmit the information to a database. In some embodiments, the reading system may be wirelessly coupled to the database. In other embodiments, the database may be a component of the reading system.

Figure 9:
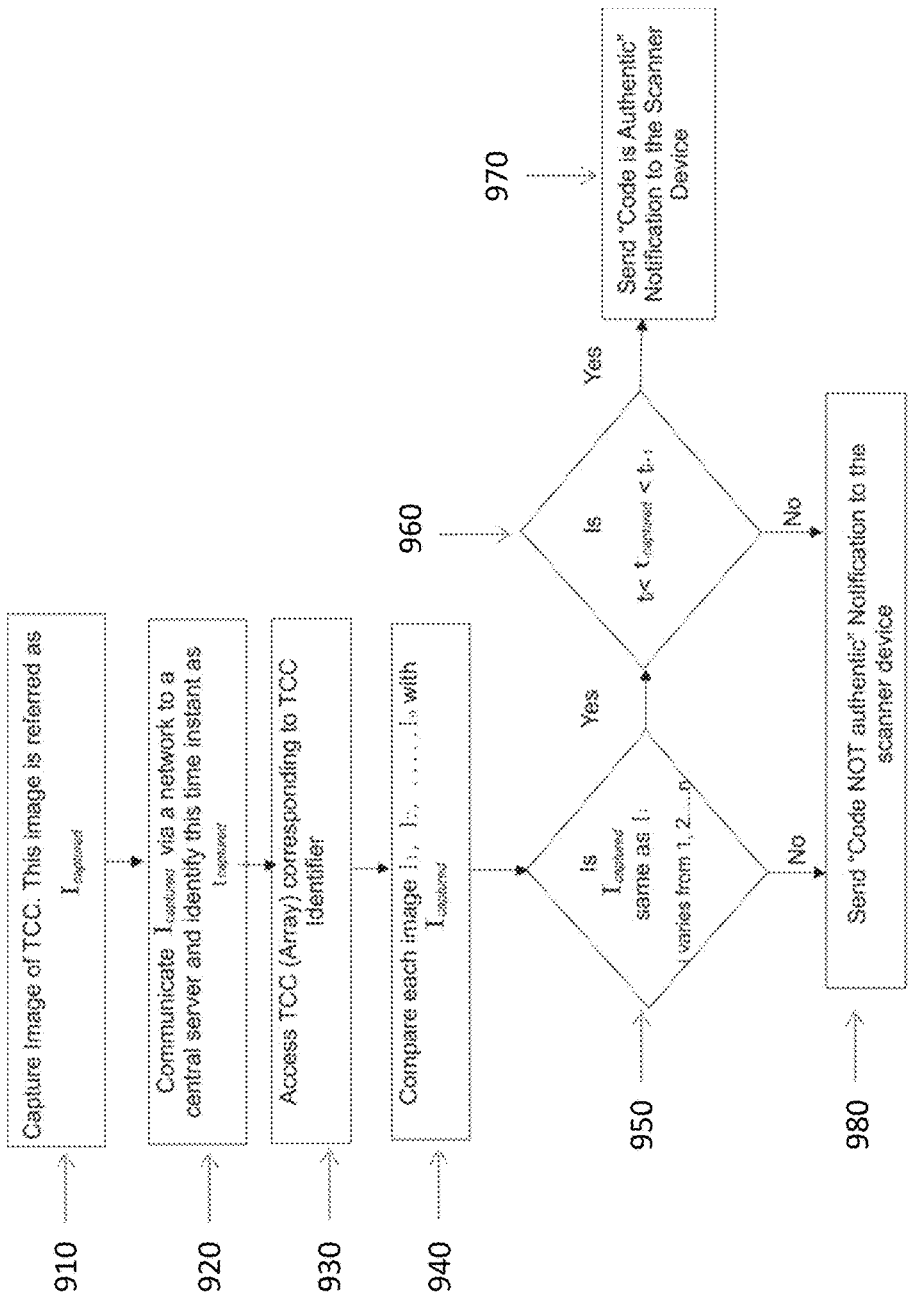
FIG. 9 depicts a flow diagram for authenticating a code in accordance with an illustrative embodiment.

In an embodiment, the dynamic security code system 700 may further include a database. The database may be configured to receive and store a record of a chronological order of patterns 710, 720, 730, 740, 750. In an embodiment, the chronological order of patterns may represent a dynamic security code as its observable pattern changes over time. In an embodiment, the database may include an algorithm to read the patterns 710, 720, 730, 740, 750, as illustrated in FIG. 9. In some embodiments, the algorithm may be configured to identify a name of the product, an expiration of the product, quantity and a batch number of the product.

In some embodiments, the database may be configured to identify completed events. A completed event may correspond to a time period when a material has completely sublimated and the macropixels covered by the material may be fully exposed. For example, referring back to FIG. 7, in one embodiment, if code 700 is read on day 28 and material B has not completely sublimated, the record will identify the second pattern 720 (i.e., the pattern that was first observable on day 15), even though the macropixels corresponding to day 30 may be almost exposed. However the macropixels corresponding to day 30 are not fully exposed, thus the event is not complete, so the pattern is recorded as the second pattern 720. In another example, if code 700 is read on day 52 and material C has not completely sublimated, the record will identify the second pattern 730 (i.e., the pattern that was first observable on day 30). In an embodiment, the database may only validate patterns represented completed events.

FIG. 9 depicts a flow diagram for authenticating a code in accordance with an illustrative embodiment. In an embodiment, a code can be authenticated using an authentication algorithm 900. The authentication algorithm 900 can be stored in a database on a server. The authentication algorithm 900 can be performed by a processor executing on the database. In an embodiment, the server may be a cloud server. The server may be located locally or remotely from a scanning device. In other embodiments, the authentication algorithm 900 is stored on a database on the scanning device and is executed by a processor on the scanning device.

In an operation 910, an image of a time changing code (TCC) is acquired and time a ($t_{captured}$) at which the image was taken. The image of the time changing code ($I_{captured}$) may be captured by a scanning device, such as the reading system described above. In an operation 920, the image of the time changing code ($I_{captured}$) and the time a ($t_{captured}$) are transmitted to the server. The scanning device and the server may be communicatively coupled via any communications protocols, for example and without limitation over a LAN, WAN, Telecom Network, or Internet via various short range and long range communication protocols.

In an operation 930, the processor accesses a time changing code array. The time changing array may include a group of pre-determined chronological images of the security code. The pre-determined-chronological images represent what the security code will look like at various times during the security code's lifespan. The pre-determined chronological images can be developed based on characteristics of the materials in the sublimating compound layer (e.g., sublimation rates, diffusion rate across the shielding layer, thickness) and the characteristics of the materials in shielding layer (e.g., thickness, viscosity, diffusion rate). The pre-determined chronological images can be computer generated and stored in the database. In some embodiments, the database may access the time changing code array responsive to receiving an image of the time changing code. In an embodiment, the database may include a unique identifier for each time changing code array. Additionally, the time changing code array may include a data structure of various images of a time changing code.

In an operation 940, the processor compares the received image of the time changing code to the images stored in the time changing code array. In an embodiment, the processor may compare the received image to the images stored in the database until it finds a match. The match is a security code pattern in the stored image that resembles the security code in the received image. The processor may compare the images in chronological order based on the different stages of the lifespan of the security code.

In an operation 950, a determination is made whether the received image of the time changing code matches an image in the time code array. If there is a match, the process moves to operation 960. In an operation 960, the time ($t_{captured}$) at which the image was captured is compared to identifiers corresponding to the matched image. Information related to when the security code was created or initiated (e.g., a protective layer was peeled off) can be stored in the database. The processor can calculate the current age of the security code based on the creation date and the time ($t_{captured}$) the image was captured. The identifier indicates a specific time in the security code's life cycle. The time ($t_{captured}$) the image was captured by the scanning device should correspond to the identifier of the image stored in the time code array. If the identifier matches, in an operation 970, the time changing code is authenticated, and a response "Code is Authentic" is transmitted to the scanning device, such as the reading system as described above.

If the result of the comparison in operations 950 and/or operation 960 is negative, then in an operation 980, the time changing code is not authenticated, and a response "Code NOT authentic" is transmitted to the scanning device, such as the reading system as described above.

In some embodiments, the nature of the code may be a covert type, however there may be an observable and overt feature intrinsic to the code. Although the time changing code cannot be interpreted by the consumer, the change in patterns over time can be visually perceived. Thus, the proposed technology may be applicable for counterfeit tactics, for example and without limitation: repackaging of genuine product in counterfeit packaging, relabeling of expired or withdrawn stock, relabeling of low-dose products to indicate higher doses, selling products not authorized for sale, using counterfeit documentation, diversion, or completely fake products.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
   a base layer comprising a first pattern;
   a sublimating compound layer comprising a plurality of materials selectively covering the base layer, wherein the plurality of materials are configured to sublimate at respective sublimation rates; and
   a shielding layer configured to shield the base layer and the sublimating compound layer to form a security code, wherein the shielding layer is configured to control a diffusion rate of the plurality of materials through the shielding layer such that the security code is changed.

2. The system of claim 1, wherein the first pattern comprises a grid formation.

3. The system of claim 1, wherein the base layer comprises a color pattern printed on a substrate.

4. The system of claim 1, wherein the plurality of materials comprises different colors.

5. The system of claim 1, wherein the plurality of materials comprises different compounds, and wherein each of the plurality of materials has a different sublimation rate.

6. The system of claim 1, wherein the plurality of materials comprises at least one of a heterocyclic organic compound and an organometallic compound.

7. The system of claim 1, wherein the shielding layer is configured to control a difference between a saturated vapor pressure and a partial pressure in a bulk vapor that accumulates over the sublimating compound layer.

8. The system of claim 1, wherein the shielding layer comprises a permeable material configured to allow a build-up of a local vapor pressure.

9. The system of claim 1, wherein an overall rate of disappearance of the plurality of materials in the sublimating compound layer is based on the respective sublimation rates and the diffusion rate of the plurality of materials through the shielding layer.

10. The system of claim 1, further comprising a selectively-removable protective layer configured to prohibit sublimation of the plurality of materials.

11. The system of claim 1, wherein the sublimating compound layer and the shielding layer are coupled to the base layer via at least one of a direct adhesion and an intermediate material.

12. The system of claim 1, wherein the base layer further comprises deposition cavities to couple the sublimating compound layer and the shielding layer to the base layer.

13. The system of claim 1, further comprising a scanner configured to scan an image of the security code.

14. The system of claim 1, further comprising a processor executing on a reference database, the processor configured to:
   generate an array of pre-determined chronological images scan of the security code;
   compare the scan of the security code to the array of pre-determined chronological images; and
   authenticate the security code based upon the comparison.

15. A method comprising:
   creating a base layer comprising a first pattern;
   selectively covering the base layer with a sublimating compound layer comprising a plurality of materials, wherein the plurality of materials are configured to sublimate at respective sublimation rates; and
   shielding the base layer and the sublimating compound layer with a shielding layer to form a security code, wherein the shielding layer is configured to control a diffusion rate of the plurality of materials through the shielding layer such that the security code is changed.

16. The method of claim 15, further comprising creating the first pattern in a grid formation.

17. The method of claim 15, wherein the base layer comprises a color pattern printed on a substrate.

18. The method of claim 15, wherein the plurality of materials comprises different colors.

19. The method of claim 15, wherein the plurality of materials comprises different compounds, and wherein each of the plurality of materials has a different sublimation rate.

20. The method of claim 15, wherein the plurality of materials includes at least one of a heterocyclic organic compound and an organometallic compound.

21. The method of claim 15, further comprising controlling, by the shielding layer, a difference between a saturated vapor pressure and a partial pressure in a bulk vapor that accumulates over the sublimating compound layer.

22. The method of claim 15, wherein the shielding layer comprises a permeable material configured to allow a build-up of a local vapor pressure.

23. The method of claim 15, wherein an overall rate of disappearance of the plurality of materials in the sublimating compound layer is based on the respective sublimation rates and the diffusion rate of the plurality of materials through the shielding layer.

24. The method of claim 15, further comprising prohibiting, by a selectively-removable protective layer, the sublimation of the plurality of materials.

25. The method of claim 15, further comprising coupling the sublimating compound layer and the shielding layer to the base layer via at least one of a direct adhesion and an intermediate material.

26. The method of claim 15, further comprising coupling deposition cavities to the base layer, wherein the deposition cavities are configured to couple the sublimating compound layer and the shielding layer to the base layer.

27. The method of claim 15, further comprising changing a thickness of the shielding layer to change the diffusion rate of the plurality of materials through the shielding layer.

28. The method of claim 15, further comprising changing a viscosity of the shielding layer to change the diffusion rate of the plurality of materials through the shielding layer.

* * * * *